Aug. 26, 1941.　　　W. E. FISHER　　　2,253,850
AUXILIARY LEFT FOOT THROTTLE FOR MOTOR-DRIVEN VEHICLES
Filed March 23, 1940
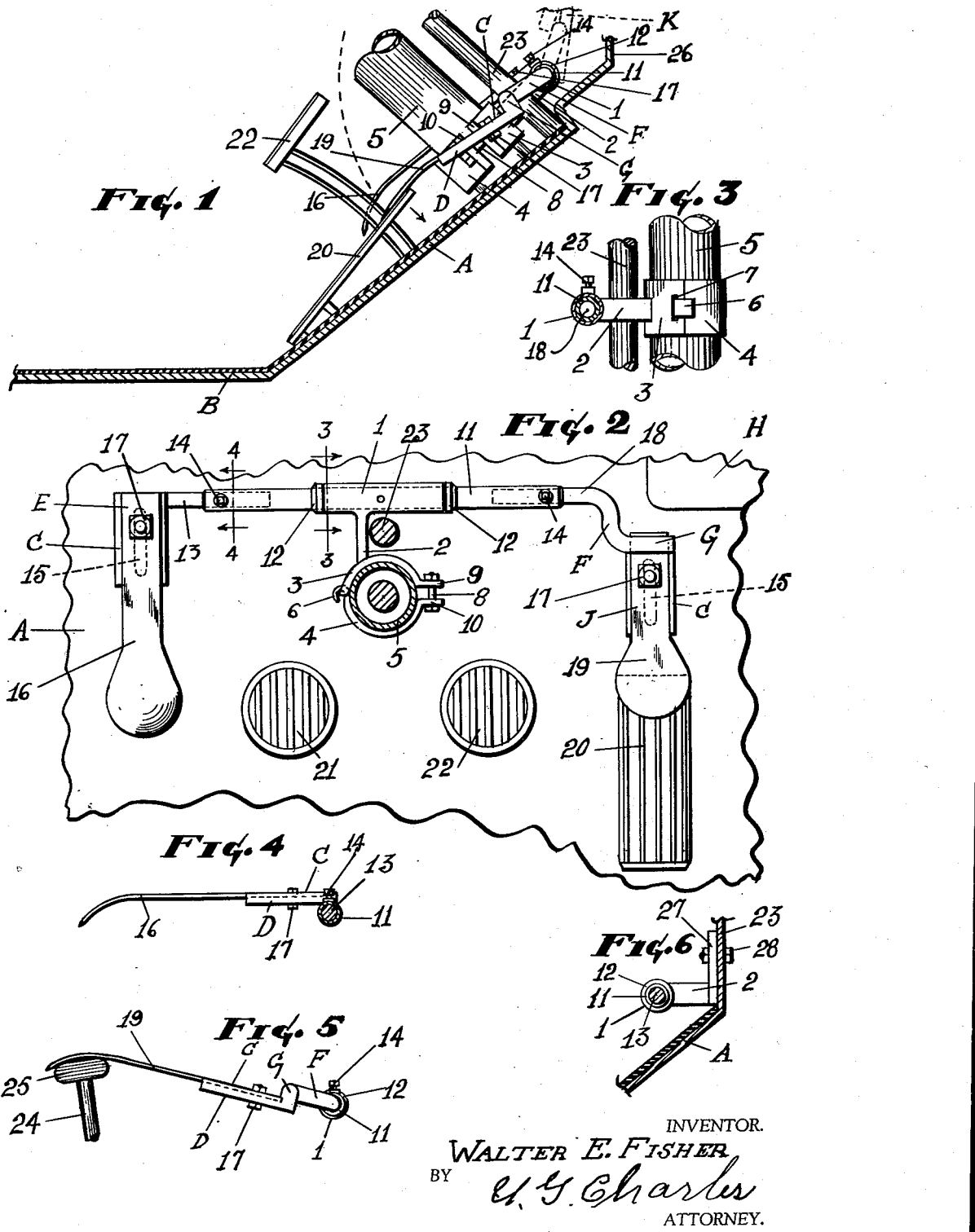
INVENTOR.
WALTER E. FISHER,
BY E. G. Charles
ATTORNEY.

Patented Aug. 26, 1941

2,253,850

UNITED STATES PATENT OFFICE 2,253,850

AUXILIARY LEFT FOOT THROTTLE FOR MOTOR-DRIVEN VEHICLES

Walter E. Fisher, Wichita, Kans.

Application March 23, 1940, Serial No. 325,491

2 Claims. (Cl. 74—513)

My invention relates to an auxiliary left foot throttle for motor-driven vehicles, and has for its principal object an auxiliary pedal system for left foot control.

A further object of my invention is to provide an auxiliary pedal rockably connected to the vehicle to discontinue its use optionally and without obstructing or discommoding the present accelerating arrangement.

A still further object of my invention is to provide auxiliary pedals operative by the right or left foot optionally to accelerate a motor.

A still further object of my invention is to provide an auxiliary mechanism that may be applied to different makes of motor-driven vehicles without mutilation or change of the original arrangement in such vehicle.

A still further object of my invention is to provide a means for right or left foot acceleration efficient in its performance, and simple in construction and installation.

These and other objects will hereinafter be more fully explained, reference being had to the accompanying drawing forming a part thereof.

Referring to the drawing:

Fig. 1 is a side view of the device in connection with the floor board of a vehicle body, the latter being in section.

Fig. 2 is a plan view of Fig. 1.

Fig. 3 is a sectional view taken on line 3—3 in Fig. 2.

Fig. 4 is a sectional view taken on line 4—4 in Fig. 2.

Fig. 5 is a side view of the pedal as applied to a button type accelerator.

Fig. 6 is a modified bearing for the pedal shaft as carried by the front vertical wall of the body.

My invention herein disclosed relates to an auxiliary left foot throttle for motor-driven vehicles, the component parts thereof consisting of a tubular bearing 1, having an arm 2 transversely extending, one end of which is integrally joined to the said bearing while the other is integrally joined to a clamp consisting of two jaws 3 and 4, respectively, the jaws adapted to encircle the steering post housing 5 of the vehicle. One side of the jaws are rockably connected by a hook 6 integral with jaw 4 and adapted to engage in eye 7 of jaw 3, the other side of the jaws being secured by a bolt 8 engaging in apertures extending through the ears 9 and 10 of said jaws, by which means, the said tubular bearing is rigidly carried at the forward side of the steering post housing and being in parallelism with the slanting portion A of the floor B of the vehicle body.

Rockably mounted in the said tubular bearing is a hollow shaft 11, each end portion of which extends axial from its respective end of the bearing and being retained against longitudinal movement by shoulders 12 formed on the shaft to abut with their respective ends of the bearing.

Telescopically engaging in one end of the hollow shaft is a cylindrical shaft 13, said shaft portion being adapted to turn and move longitudinally in its respective end of the hollow shaft for adjustment, and being secured by a set screw 14 threadedly engaging near the outer end of the hollow shaft. Transversely extending and integrally joined at right angle to the outer end of the shaft is a channelled plate having legs C and a web D, said web having an elongated slot 15 therethrough in parallelism with the legs. Seated in the channel is the shank E of a foot plate 16, the shank having an aperture near its end opposite the plate portion through which a bolt 17 will extend to engage in said slot 15, whereby the pedal is adjustably secured longitudinally to vary its power of leverage, and being operated by the left foot.

Rockably and telescopically engaging in the other end of the hollow shaft is another shaft 18 axially extending a short distance and being likewise secured when properly adjusted with respect to its longitudinal and rocked position. Last said cylindrical shaft has a crank F extending at right angle and having a bent portion G in parallelism with its shaft portion 18, being so offset will obviate its contact with an inward extension of the floor board as at H which is a common occurrence in floor construction. Said portion G has a channel integrally joined at right angle thereto, the channel being similar to the channel previously described, and in which is positioned the shank J of a foot plate 19, last said plate adapted to seat on the accelerating lever 20 to rock the same for acceleration by a downward press on the left foot pedal, and the said right and left pedals above described being adjusted longitudinal is means to accommodate for a varying position of the acceleration lever from the steering post, in other words, the foot pedals each are capable of universal adjustment, and the longitudinal adjustment of the left pedal is to meet the leverage required to operate the accelerator in comparison with its normal spring tensioning means.

Fig. 2 illustrates the relative position of the steering post, clutch pedal 21 and brake pedal 22, and inasmuch as certain makes have a gear shift operated at the steering wheel, the same has a shaft 23 in parallelism with the steering post and aligned with respect to the longitudinal axis of the vehicle, in such case, arm 2 is eccentrically connected to the bearing with respect to its length, otherwise the arm may be centrally positioned or eliminated for direct connection of the bearing to one jaw of the clamp.

Fig. 5 shows a modification wherein the accelerator has a stem 24 and a head 25 on the upper end thereof, in such arrangement, the pedal 19 has a curvature to properly seat on the head.

Fig. 6 illustrates a modification wherein the tubular bearing is connected to the front wall 26 of the body adjacent where it connects with the slant A of the floor at its upper extremity, the bearing having a similar arm 2 with a plate 27 secured to its outer end at a right angle, through which a bolt 28 will extend as securing means for the bearing to the said vertical wall.

It will be understood that the auxiliary mechanism may be rocked to the front wall as shown by dotted lines K, eliminating its use, and furthermore the accelerator lever may be operated by the right foot in the usual manner regardless of engagement or disengagement of the auxiliary device.

While I have shown and described a specifically joined auxiliary left foot accelerating device, I do not wish to be restricted as such details may have other means of securing the rockable and telescopical features whereby the set screws may be eliminated, and the shoulders at the ends of the bearing may be adjustably arranged and removable. The exact form of the pedals may vary and have positioned thereon rubber plates, and such other modifications may be employed as lie within the scope of the appended claims.

Having fully described my invention what I claim as new and desire to secure by Letters Patent is:

1. In an auxiliary left foot throttle for motor-driven vehicles, of the class described, in combination with an accelerator of a motor-driven vehicle, a tubular bearing and a clamp integrally joined by an arm, the clamp having means to secure the same to a steering post housing of the vehicle, a hollow shaft extending through the hollow of the bearing and rockable therein so that each end of the hollow shaft extends outward from its respective end of the bearing, a solid shaft insertible in each end of the hollow shaft so that a portion of each thereof extends outward, and means to secure the same against turning and longitudinal movement but rotatable with said hollow shaft, a slotted channelled plate secured to the outer extension of each shaft and rockable therewith, each of said slotted channelled plates having the shank of a foot plate seated in the channel and a bolt extending through each shank and its respective slot in the channelled plate as means to adjustably secure the foot plate at a predetermined extension of the foot plates toward and from their respective channelled plates, one of said foot plates to engage on the accelerator plate as actuating means therefor and being rocked by the other foot plate to accelerate the motive power of the vehicle.

2. In an auxiliary left foot throttle for motor-driven vehicles, of the class described, in combination with an accelerator of a motor-driven vehicle, a tubular bearing and a clamp integrally joined by an arm, the clamp having means to secure the same to a steering post housing of the vehicle, a hollow shaft extending through the hollow of the bearing and rockable therein so that each end of the hollow shaft extends outward from its resepctive end of the bearing, a solid shaft insertible in each end of the hollow shaft so that a portion of each thereof extends outward, and means to secure the same against turning and longitudinal movement but rotatable with said hollow shaft, the outer extremity of one of said solid shafts being bent to form a crank, the crank and shaft at the other end of the hollow shaft having a channelled plate rigidly secured to rock when the shafts are turned and each of said channelled plates having a foot plate secured therein and rockable therewith whereby the motor of the vehicle is accelerated by a downward rock of said foot plates simultaneously.

WALTER E. FISHER.